(12) United States Patent
Freller

(10) Patent No.: US 6,851,134 B2
(45) Date of Patent: Feb. 8, 2005

(54) BERTH SYSTEM, ESPECIALLY FOR MEANS OF TRANSPORTATION

(76) Inventor: Walter Freller, Innerschwand 226, Mondsee (AT), A 5310

( * ) Notice: Subject to any disclaimer, the term of this patent is extended or adjusted under 35 U.S.C. 154(b) by 0 days.

(21) Appl. No.: 10/399,648

(22) PCT Filed: Oct. 15, 2001

(86) PCT No.: PCT/AT01/00330
§ 371 (c)(1),
(2), (4) Date: Apr. 18, 2003

(87) PCT Pub. No.: WO02/32718
PCT Pub. Date: Apr. 25, 2002

(65) Prior Publication Data
US 2004/0012235 A1 Jan. 22, 2004

(30) Foreign Application Priority Data
Oct. 19, 2000 (AT) .................................. A 1794/2000

(51) Int. Cl.$^7$ .............................................. A47C 19/00
(52) U.S. Cl. ............................. 5/9.1; 52/79.4; 52/79.3; 105/314; 105/316; 105/315; 105/322; 297/232; 244/159
(58) Field of Search ................................ 52/2.17–2.19, 52/2.11; 5/1, 9.1, 79.2–79.4; 297/323; 244/158, 159, 118; 105/314, 315, 316, 319, 322

(56) References Cited

U.S. PATENT DOCUMENTS

| | | |
|---|---|---|
| 2,563,917 A | 8/1951 | Raymond et al. |
| 2,884,873 A | 5/1959 | Candlin, Jr. |
| 2,997,898 A | 4/1961 | Candlin, Jr. et al. |
| 3,784,989 A * | 1/1974 | LeGrand ......................... 5/9.1 |
| 4,227,828 A * | 10/1980 | Ivanov et al. .................. 405/1 |
| 4,440,439 A * | 4/1984 | Szabo .......................... 297/62 |
| 4,582,354 A | 4/1986 | Halim |
| 4,589,612 A | 5/1986 | Halim |
| 4,745,643 A | 5/1988 | Clarke |
| 6,467,221 B1 * | 10/2002 | Bigelow ..................... 52/2.17 |
| 6,591,221 B1 * | 7/2003 | Doyle ........................ 702/159 |

FOREIGN PATENT DOCUMENTS

| | | |
|---|---|---|
| DE | 36 11 671 | 10/1987 |
| DE | 39 01 540 | 7/1990 |
| FR | 943 852 | 3/1949 |

* cited by examiner

Primary Examiner—Carl D. Friedman
Assistant Examiner—Chi Q. Nguyen
(74) Attorney, Agent, or Firm—Collard & Roe, P.C.

(57) ABSTRACT

A berth arrangement, especially for means of transport, is described, comprising a plurality of single berths (1) which are arranged in rows in a successive, superimposed and mutually offset fashion and receive at least one reclining seat (6), and which berths form a sitting room (2) and a foot room (3) starting out from the sitting room (2), with the height of the foot room being smaller than the sitting room height. In order to provide advantageous constructional conditions it is provided that the respective ceilings (5) and floors (4) of the sitting rooms (2) correspond to the negative shapes of the floors (10) and ceilings (9) of the foot space (3).

5 Claims, 2 Drawing Sheets

BERTH SYSTEM, ESPECIALLY FOR MEANS OF TRANSPORTATION

CROSS REFERENCE TO RELATED APPLICATIONS

Applicant claims priority under 35 U.S.C. §119 of Austrian Application No. A 1794/2000 filed Oct. 19, 2000. Applicant also claims priority under 35 U.S.C. §365 of PCT/AT01/00330 filed Oct. 15, 2001. The international application under PCT article 21(2) was not published in English.

TECHNICAL FIELD

The invention relates to a berth arrangement, especially for means of transport, with a plurality of single berths which are arranged in rows successively, above each other and mutually offset and receive at least one reclining seat, and which berths form a sitting room and a foot space starting out from the sitting room whose height is smaller than the sitting room height.

RELATED ART

In order to offer passengers the possibility to lie down by taking the generally restricted space in means of transport it is known (U.S. Pat No. 4,745,643 A) to situate berths which are made of plastic for example in rows one after the other or above each other. Said berths which are quadrangular and each receive one reclining seat are provided with a height adjusted to a lying passenger, so that the individual berths can merely be used as sleeping berths and are not suitable for the presence of passengers outside of the sleeping periods. In order to avoid this disadvantage it has already been proposed (DE 36 11 671 A1) to arrange a frame forming sleeping berths in such a way that after a reconfiguration seating arrangements for the passengers are provided, namely with a sufficient room height. This is achieved in such a way that by an alternating putting up of a part of the berth floor the berths are subdivided in the longitudinal center, thus leading to a berth section of half the length but double height due to the floor open alternatingly on both sides. As a consequence, space is provided in these sections for an upright sitting position. The disadvantageous aspect in such a construction is on the one hand the necessity of reconfiguration, for which purpose the passengers need to leave the berths, and on the other the fact that after the reconfiguration only half the berth length is available.

Finally, it is known (U.S. Pat. No. 4,582,354 A) to provide berths with a sitting room and a foot space starting out from the sitting room whose height corresponds to half the sitting room height. Said single berth arrangement enables a mutually offset arrangement of single berths above each other, with the foot spaces which come to lie above each other supplement each other in pairs to a sitting room height. Although thus achievable interleaving of the single berths allows a favorable utilization of space, it still produces a mutually opposite alignment of the single berths which lie above each other with their foot spaces. This leads in a berth arrangement in the traveling direction to the consequence that half the single berths thus interleaved are provided with reclining seats which are aligned in the direction opposite to the traveling direction. An additional factor is that the sitting room height cannot be chosen independent from the foot room height.

DESCRIPTION OF THE INVENTION

The invention is thus based on the object of configuring a berth arrangement of the kind mentioned above with simple constructional means in such a way that a uniform alignment of all single berths is enabled under an advantageous utilization of space and the sitting room height can be chosen independent from the foot room height in order to provide both advantageous lying as well as sitting conditions for the user.

The invention achieves this object in such a way that the respective ceilings and floors of the sitting rooms correspond to the negative shapes of the floors and ceilings of the foot space.

Since as a result of this measure the foot and sitting rooms of the single berths arranged above each other come to lie alternatingly one on top of the other, the sitting and foot rooms situated alternatingly above each other determine the overall height of the berth arrangement. The sitting room height and the foot room height can be determined independently from each other. This provides advantageous conditions in order to offer sufficient space for upright sitting in the sitting room of the single berths, which thus only allows a pleasant sojourn in the single berths beyond the sleeping time. Despite the comparatively large sitting room height, the overall height of the berth arrangement can be kept comparatively low because the foot room height can be provided respectively low. As a result of the possible large sitting room height, the single berths can not only be equipped in a variety of ways according to the needs of the berth users, but can provide the reclining user with a sense of well-being that can hardly be impaired by users of adjacent berths due to the then large free space up to the ceiling of the sitting room.

The mutual adjustment of the progress of the floor and ceiling in the region of the sitting and foot rooms ensures a favorable utilization of the berth arrangement on the one hand and entails a stiffening of the berth arrangement on the other hand, which in view of the weight limitation usually applied in means of transport is of relevant importance. The direct connection of the single berths placed above each other in the floor and ceiling regions is not mandatorily required. It is possible to provide measures for additional storage space between the individual berths by ensuring a different shape of the floors and ceilings of the individual berths which are mutually adjacent with respect to their height.

The shaping of the foot space can be provided in different forms with respect to the different reclining postures. Especially advantageous conditions can be obtained in this connection when the foot room of the individual berths is provided with a distance above the floor and below the ceiling of the sitting room of the individual berths, preferably in the region of the middle third of the sitting room height, because in this case an advantageous elevation of the legs while lying is enforced by the foot room.

Due to their arraying behind one another and above each other, the access to the individual berths must occur from the side. For this purpose the individual berths can be provided with access openings at least on one longitudinal side in the region of the sitting room. Single berths for a single user merely require access openings on a longitudinal side. If wider individual berths for two users are provided, access openings are recommended on either longitudinal side in order to make the independent entry and exit easier for the users.

The access to the access openings can be facilitated by means of various climbing aids such as ladders. An especially advantageous construction can be obtained in this connection when the individual berths are provided in the region of their foot rooms with a narrower tapering arrangement towards the end of the feet, so that the ceilings of the sitting rooms in the region of the narrower end of the single berth situated above lead to a bearing surface which can be used like steps. The use of the climbing aid can be facilitated by providing respective handles on the side walls of the individual berths.

BRIEF DESCRIPTION OF THE DRAWINGS

Examples of the subject matter of the invention are shown in the drawings, wherein.

DETAILED DESCRIPTION OF THE PREFERRED EMBODIMENT

Figure 1:
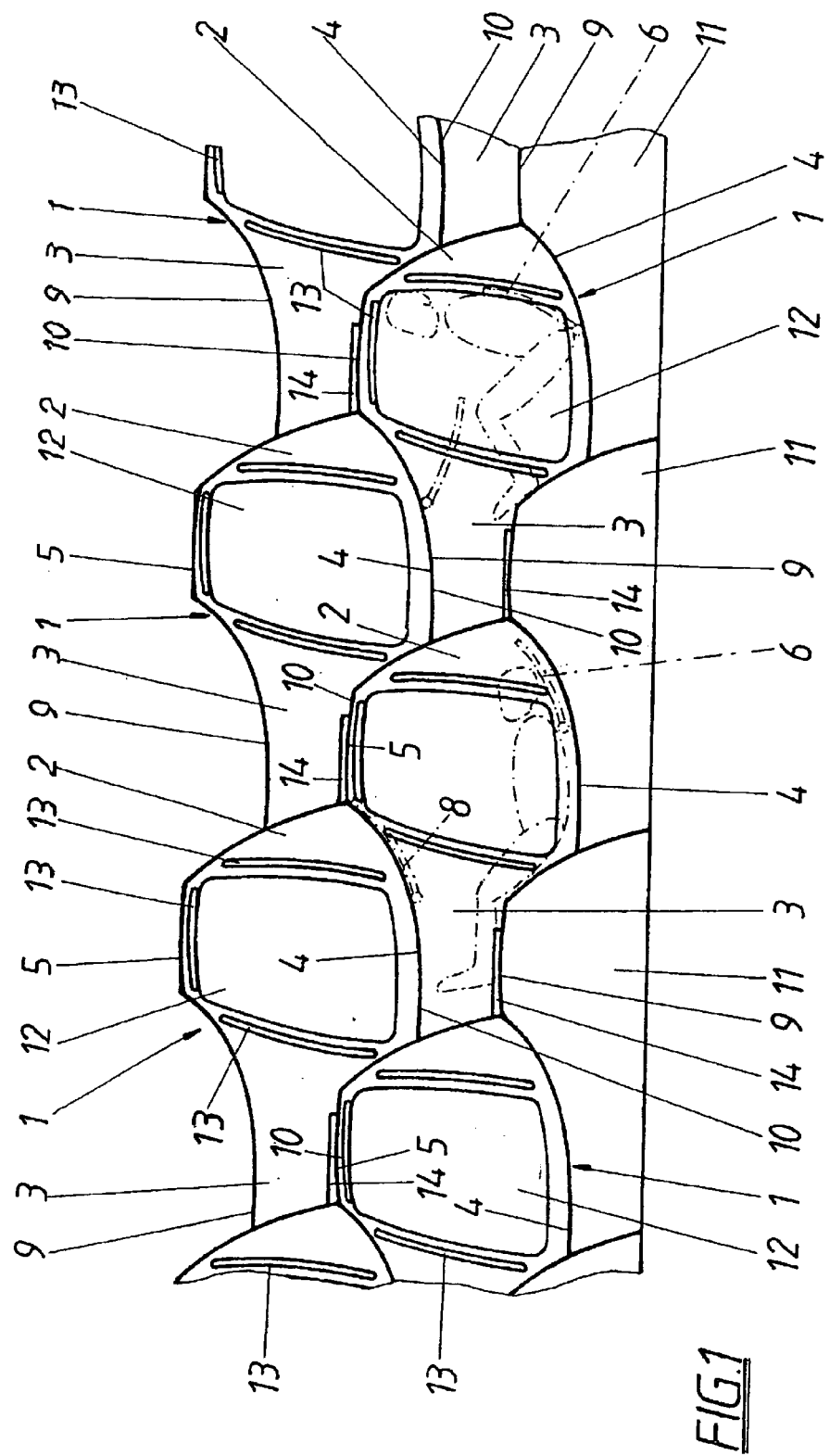
FIG. 1 shows a berth arrangement in accordance with the invention in a schematic side view.

The represented berth arrangement is made up of single berths 1 which each form a sitting room 2 and a foot room 3 starting out from the same, namely according to the embodiment for two persons. The arrangement is made in such a way that the foot room 3 above the floor 4 and below the ceiling 5 of the sitting room 2 is connected to the sitting room 2 in the region of the middle third of the sitting room height. As a result of this foot room arrangement, an advantageous lying position is achieved for the berth user, as is indicated by the dot-dash line in a single berth 1. From the lying position it is possible to assume a seated position, for the purpose of which the installed reclining seats 6 must be adjusted accordingly, such that a part of the reclining seat 6 is swiveled upwardly as a back-rest, as has also been entered in a dot-dash line for a sitting user. In this sitting position it is possible to swivel out a table surface 7 or use additional fixtures. Various fixtures of the single berth 1 can be used advantageously both in the reclined as well seated position, as is indicated for a screen 8.

As is indicated in FIG. 1, the floors 4 and the ceilings 5 of the sitting rooms 2 each correspond to the negative shapes of the ceilings 9 and the floors 10 of the foot rooms 3, so that the individual berths 1 can be arranged in rows without any gaps in a mutually offset manner. The individual berths 1 can each individually form a modular unit or have common intermediate walls which lead on the one hand to the ceiling 9 of a foot room 3 and on the other hand to the floor 4 of the sitting room 2 or the ceiling 5 of the sitting room 2 and the floor 10 of the foot room 3 of individual berths 1 stacked above each other. The space remaining below the lowermost row of berths can advantageously be used as storage space 11 in a respectively subdivided fashion.

Figure 2:
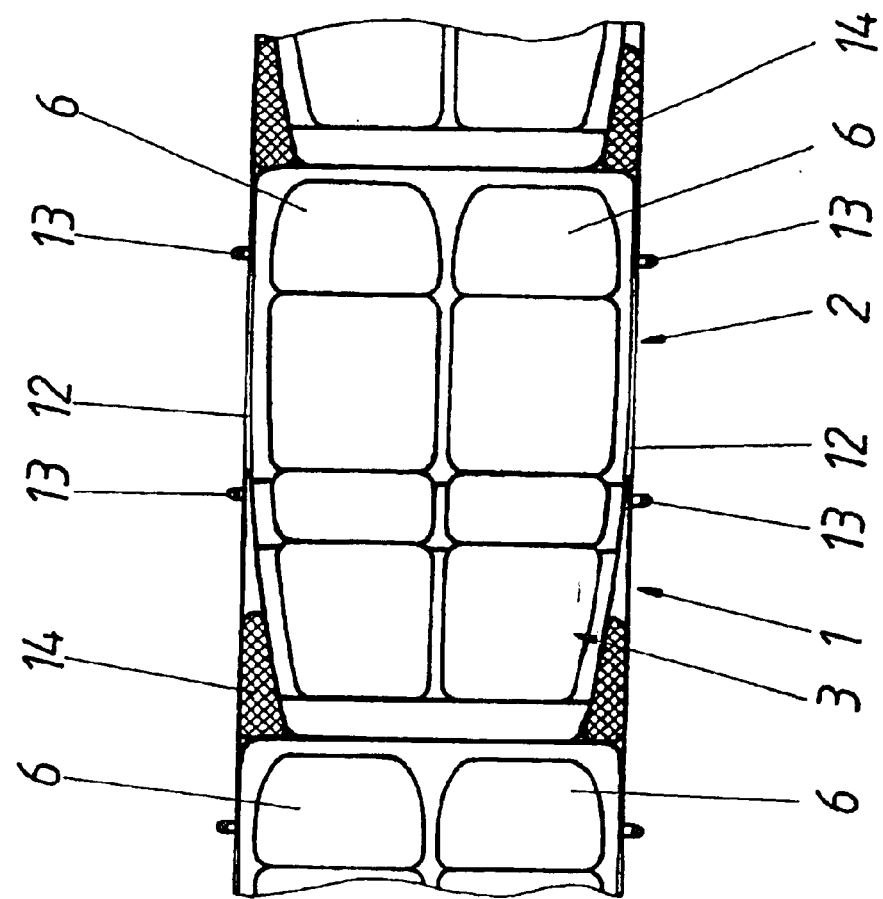
FIG. 2 shows the same berth arrangement in sections in a horizontal longitudinal sectional view.

The access to the individual berths 1 occurs via access openings 12 which are provided with handles 13. As is shown in FIG. 2, access openings 12 are provided at either side of the individual berths 1 in order to allow the mutually unimpeded entrance to and exit from of a common single berth 1 for two users. One of the two access openings 12 can be omitted for single berths for receiving merely one user. Ladders can be used as a climbing aid for entering the upper single berths 1. When the foot rooms 3 are provided with an arrangement tapering towards the foot end as is shown in FIG. 2, surface regions are obtained which can advantageously be used as bearing surfaces 14 as a result of the foot rooms 3 of the stacked single berths 1 which stand back relative to the ceilings 5 of the respective lower single berths 1 or storage spaces 11.

As a result of the berth arrangement in accordance with the invention a compact, comparatively light construction is obtained which can be used in means of transport for receiving passengers in single berths 1. The size and arrangement of the single berths 1 can be adapted to spatial conditions. The possibilities for use are not limited to means of transport, because such a berth arrangement may be potentially used wherever a plurality of persons are to be accommodated with little space in a manner which substantially excludes any mutual disturbance of the users of the berth arrangement.

What is claimed is:

1. A berth arrangement comprising successive rows of berths, the berths in alternating ones of the successive rows being offset from each other and the berths in succeeding ones of the rows being superimposed on the berths of rows preceding the succeeding rows, each berth having at least one reclining seat and defining a sitting room and a foot space between a floor and a ceiling, the sitting room being higher than the foot space, the ceilings of sitting rooms of the berths in the preceding rows forming the floors of the foot spaces of the berths in the succeeding rows.

2. The berth arrangement of claim 1, wherein the foot space of each berth is arranged at a distance above the floor and below the ceiling of the sitting room.

3. The berth arrangement of claim 2, wherein the distance is in a middle third of the height of the sitting room.

4. The berth arrangement of claim 1, wherein each berth has an access opening to the sitting room at least at one longitudinal side thereof.

5. The berth arrangement of claim 1, wherein the foot spaces of the berths are tapered to narrow towards a foot end of the foot spaces, and the ceilings of the sitting rooms form a bearing surface at the foot end of the foot spaces of the superimposed berths.

* * * * *